United States Patent
Morgans et al.

[11] Patent Number: 5,885,669
[45] Date of Patent: Mar. 23, 1999

[54] LIQUID CRYSTAL DEVICE AND METHOD

[75] Inventors: David Evan Bryan Morgans, Port Huron; John Hickman, North Street, both of Mich.

[73] Assignee: Acheson Industries, Inc., Port Huron, Mich.

[21] Appl. No.: 907,471

[22] Filed: Aug. 8, 1997

[51] Int. Cl.$^6$ .................................................. G02F 1/1335
[52] U.S. Cl. .............................. 428/1; 349/110; 349/111
[58] Field of Search .............................. 428/1; 349/110, 349/111

[56] References Cited

U.S. PATENT DOCUMENTS

| | | | |
|---|---|---|---|
| 4,392,717 | 7/1983 | Shibuya et al. | 350/334 |
| 4,437,731 | 3/1984 | Sudo et al. | 350/340 |
| 4,469,409 | 9/1984 | Nakano et al. | 350/341 |
| 4,495,083 | 1/1985 | Imazeki et al. | 252/299.1 |
| 4,815,821 | 3/1989 | Nonogaki et al. | 350/164 |
| 4,976,887 | 12/1990 | Takatoh et al. | 252/299.1 |
| 5,307,187 | 4/1994 | Sunohara et al. | 359/51 |
| 5,358,810 | 10/1994 | Yoshino | 430/20 |
| 5,596,435 | 1/1997 | Sunohara et al. | 349/132 |

*Primary Examiner*—Alexander Thomas
*Attorney, Agent, or Firm*—Dinnin & Dunn, P.C.

[57] ABSTRACT

A liquid crystal display device having a liquid crystal layer interposed between a pair of substrates, said substrates being coupled to each other through an insulative sealing material at the peripheral portions thereof, one of said pair of substrates being a transparent front substrate through which viewing of the display device occurs, and a graphite containing matrix coating on an inside surface of the front substrate, said coating having a matrix of apertures therein, said coating being applied by application of a composition comprising in weight percent, about 1% to about 30% colloidal graphite, about 0.1% to about 20% binder material for the coating, and about 10% to about 98% of a fluid carrier, said applied coating having a thickness of less than about 20 microns.

29 Claims, 1 Drawing Sheet

U.S. Patent  Mar. 23, 1999  5,885,669
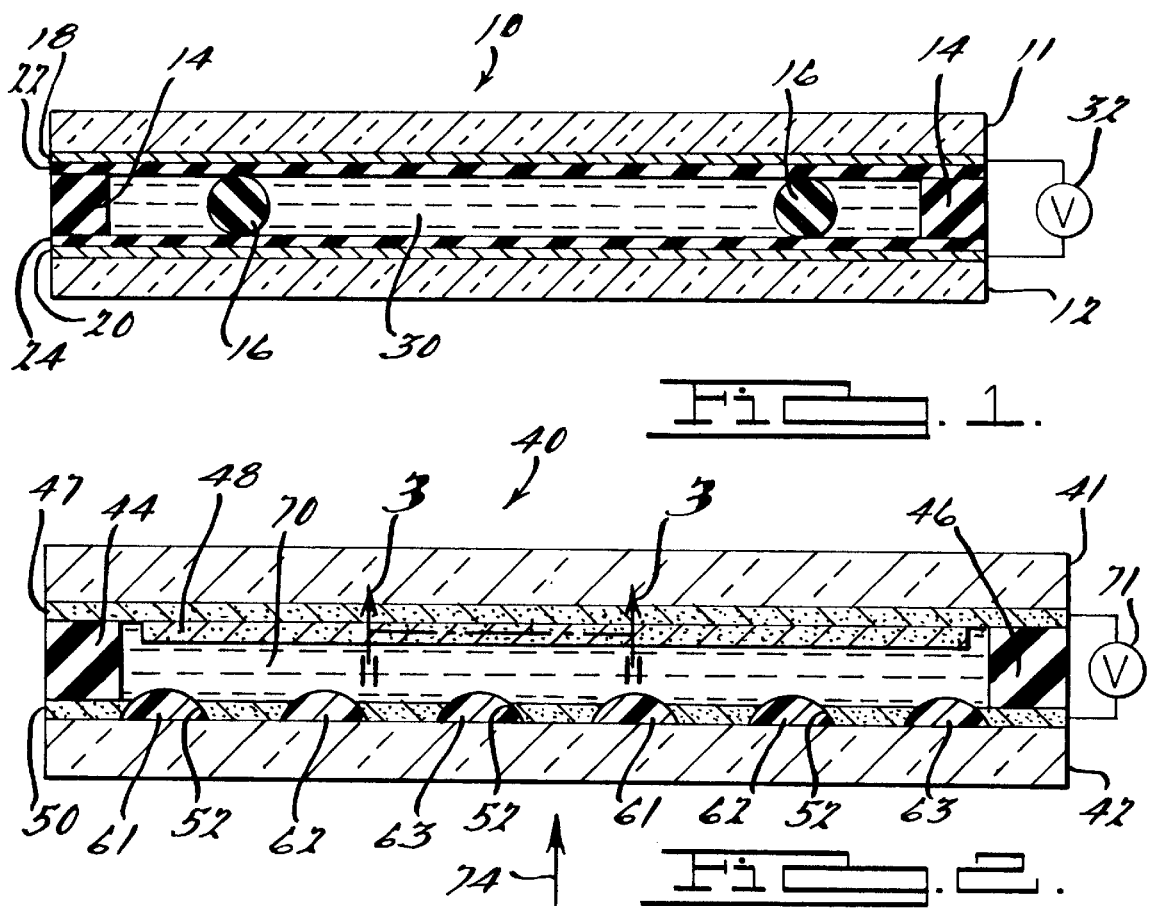
Fig. 1.
Fig. 2.
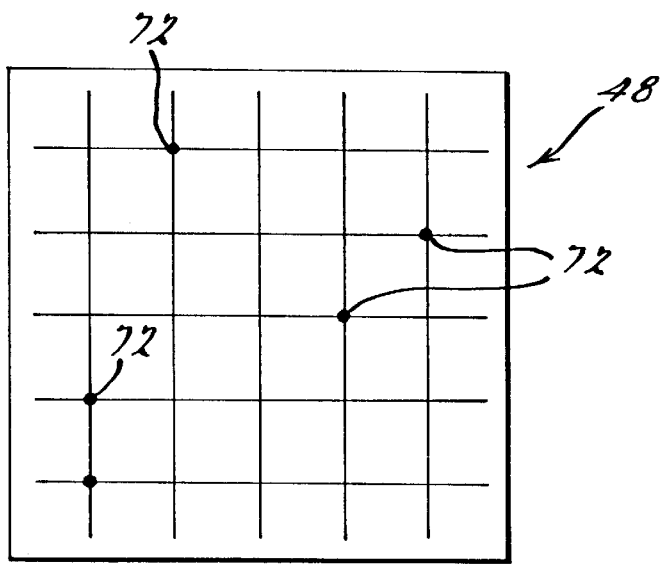
Fig. 3.

LIQUID CRYSTAL DEVICE AND METHOD

This invention broadly relates to a new liquid crystal display device and method of making same. More particularly, the invention relates to a new liquid crystal display device which utilizes a special black matrix coating on an inside surface of the front glass viewing panel.

BACKGROUND OF THE INVENTION

As known from the prior art, the liquid crystal display (LCD) device is basically comprised of two substrates (e.g. glass panels) disposed in parallel with each other at a given distance, transparent electroconductive films strips or coating layers being selectively disposed on the opposing surfaces of those two substrates, an alignment system for aligning liquid crystal molecules in a definite direction which covers each of said substrate surfaces and the electroconductive strips or layers placed thereon, and a liquid crystal filling the space between the alignment system, with the side faces of the device being tightly sealed to guard against any leakage of the liquid crystal material.

In recent years, liquid crystal display devices have been widely utilized to construct flat panel display devices, for example, in lap top computers, office automation equipment, personal computers, flat screen TV products, and the like. This is because liquid crystal devices have advantages such as low power consumption, light weight, and low or efficient space-volume requirements.

The state of the art is indicated by the following cited references, the disclosures of which are incorporated herein by reference: U.S. Pat. Nos. 5,358,810; No. 5,307,187; No. 4,469,409; No. 4,437,731; No. 5,596,435; No. 4,495,083; No. 4,392,717; No. 4,976,887; and No. 4,815,821.

In the past there have been drawbacks or disadvantages associated with the manufacture or construction of suitable commercial liquid crystal display devices. For example, in past liquid crystal display devices certain types of chromium coatings, or other sputtered metal coatings have been used as the opaque matrix between the pixels, and such materials are expensive and difficult to apply, and also chromium compounds are quite toxic. Also in prior LCD devices the users viewing angle relative to the screen has been a relatively small viewing angle. For example, those users of prior lap top computer screens (i.e. those using LCD flat panel display devices) have recognized that when the viewer's eye varies at an angle significantly different from a 90° or perpendicular visual approach to the lap top screen, then the display images on the screen become difficult to properly observe or read owing to reflection of ambient light by the chromium layer. Still further, the cost of materials and the manufacturing process costs for prior LCD or flat panel display panels screens has been relatively high and expensive.

Accordingly, it is one object of the present invention to provide a new and improved liquid crystal display device.

Another object of the present invention is to provide a novel liquid display device which utilizes a highly advantageous black matrix coating system and which also provides a considerably wider viewing angle than was previously possible with LCD flat panel screen devices.

Another object of the present invention is to provide a new liquid crystal display device which does not require the presence of any chromium coatings.

Another object of the present invention is to provide a new and improved liquid crystal display device which significantly improves on the cost of materials required to construct the device.

Another object of the present invention is to provide a new technique of constructing liquid crystal display devices wherein the manufacturing or processing costs are significantly improved.

Other objects, features and advantages of the present invention will become apparent from the subsequent description and the appended claims, taken in conjunction with the accompanying drawings.

BRIEF DESCRIPTION OF THE DRAWINGS

FIG. 1 is a sectional view showing a basic arrangement of a prior art liquid crystal display device;

FIG. 2 is a sectional view showing the arrangement of a liquid crystal display device in accordance with the present invention;

FIG. 3 is a sectional view (taken along line 3—3 in FIG. 2) showing a representation of the electrical grid used to activate electrical excitation of the liquid crystal display system.

SUMMARY OF THE INVENTION

Briefly stated, the present invention involves a liquid crystal display device having a liquid crystal layer interposed between a pair of substrates, said substrates being coupled to each other through an insulative sealing material at the peripheral portions thereof, one of said pair of substrates being a transparent front substrate through which viewing of the display device occurs, and a graphite containing matrix coating on an inside surface of the front substrate, said coating having a matrix of apertures therein, said coating being applied by application of a composition comprising in weight percent, about 1% to about 30% colloidal graphite, about 0.1% to about 20% binder material for the coating, and about 10% to about 98% of a fluid carrier, said applied coating having a thickness of less than about 20 microns.

From a method aspect, the present invention comprises a method of making a liquid crystal display device, said method comprising the steps of: (a) applying said coating to said inside surface of said front substrate by a coating technique selected from the group consisting of silk screening, photolithography, electrographically, and screen printing, said applied coating having a thickness of less than about 20 microns, and (b) subsequently coupling the pair of substrates to each other with an insulative material to seal said peripheral portions together around the boundary of the LCD device.

DESCRIPTION OF PREFERRED EMBODIMENT (S) AND BEST MODE

Referring to FIG. 1, the typical prior art liquid crystal display device is designated 10, and comprises a pair of electrode substrates 11 and 12 arranged to oppose each other with a predetermined interval by insulative sealing material 14 and spacers 16. At least one of the electrode substrates 11 and 12 are transparent, for example the front substrate 12 could be made of a transparent material such as glass. Electrode substrates 11 and 12 have a structure such that transparent electrodes 18 and 20 are formed on the glass substrates 11 and 12; and insulating layers 22 and 24 are formed thereon, and are subjected to an orienting treatment. The electrode substrates 10 and 12 are arranged such that the electrode surfaces 18 and 20 face each other. Liquid crystal composition 30 is filled in a closed spaced between the electrode substrates 22 and 24. Electrode surfaces 18 and 20 are connected to an electrical drive source designated 32 for driving the liquid crystal composition 30 in connection with operation of the FIG. 1 liquid crystal display device.

FIG. 2 illustrates liquid crystal display device designated 40 in accordance with the present invention. The display device 40 comprises a pair of electrode substrates 41 and 42 which are positioned to oppose each other with a predetermined interval by insulative sealing material 44 and 46, which sealing material also acts as a spacer to achieve the desired predetermined interval dimension between the electrode substrates 41 and 42. Optionally the device of FIG. 2 may also include spacer members such as of the type 16 shown in FIG. 1. At least one of the electrode substrates 41 and 42 are transparent, however, the electrode substrates may be made of any suitable material known in the art for such purpose. For example the front substrate 42 could typically be made of a transparent material such as glass. The electrode substrate 41 has a first luminescent layer formed thereon designated 47. On the layer 47 there is formed or deposited an electrical layer designated 48. On the front electrode or glass plate 42 there is deposited a special black matrix coating 50, which will be discussed in further detail hereinafter. The black matrix coating or layer 50 has numerous small apertures formed therein as indicated at 52, and these apertures are formed in the coating layer 50 through techniques such as photolithography, silk screening, electrographically, or screen printing. The plurality of apertures 52 are applied in a pattern, and are sometimes referred to as pixels which are repetitive arrangements of small three-part apertures, with one aperture being adapted to provide for red color, the second aperture in the three-part hole aperture being to provide the blue color, and the third aperture being to provide the green color, in a series of numerous repeating pixels of those three basic colors. Color filter materials are deposited within each aperture, as shown by the numerals 61, 62 and 63 in FIG. 2. The filter material 61 represents a green color filter, filter material 62 represents a red filter material, and color filter 63 represents a blue filter material.

Liquid crystal composition 70 is filled in the closed spaced between the electrode substrates 41 and 42. The electrode substrates 41 and 42 are connected to an electrical drive source designated 71 for driving the liquid crystal composition 70 in connection with the operation of the FIG. 2 liquid crystal display device. The electrical grid 48 can be an active matrix or a passive matrix and the electrical grid 48 is further shown by the cross-sectional view in FIG. 3. The electrical excitation points are designated 72 in FIG. 3. The various excitation points 72 operate to activate the liquid crystal layer and the electrical potential provides the necessary effect for transmitting small areas of light to the appropriate color pixels for displaying the appropriate or desired visual images in color on the front screen or glass plate 42 through which the visual image is viewed by the user of the device. The display device of FIG. 2 is viewed in the direction as shown by the arrow 74 in FIG. 2.

Colloidal graphite is an important constituent of the black matrix coating or layer 50 as described in this invention. The coating 50 is deposited or applied from a coating composition which, broadly stated, contains about 1% to about 30% by weight colloidal graphite, and preferably about 2% to about 18% by weight colloidal graphite. Best results are obtained when the coating composition contains about 3% to about 10% by weight colloidal graphite. As the term "colloidal graphite" is used herein it is also to be understood that small amounts of colloidal carbon black can also be present in the graphite, up to an amount of approximately 30% by weight of the total graphite used. Preferably however, the carbon black is not present.

The particle size of the colloidal graphite should, broadly stated, be within the range of about 0.01 to about 1 microns; and preferably the colloidal graphite should have a minimum particle size of about 0.1 to about 0.2 microns and a maximum particle size of about 2 to about 3 microns. Best results are obtained when the colloidal graphite particle size is within the range of about 0.1 to about 2 microns.

The binder material used in the coating composition should, broadly stated, be present within the range of about 0.1 to about 20% by weight of the composition; and, preferably within the range of about 0.2% to about 6% by weight of the composition. Best results are obtained when the binder material is present within the range of about 0.3% to about 2% by weight of the coating composition. The binder material can be any suitable binder which is compatible with the other materials in the liquid crystal display device and the binder should be selected from organic or inorganic binder materials. Typical organic binders which may be used are selected from a group consisting of a cellulosic binder, methylacrylate binder, acrylic binders, polysaccharide binders, hydrocarbon resin binders, polyester resin binders, vinyl resin binders, urethane resin binders, and the like. Inorganic binders which may be used are colloidal silica, colloidal alumina, and soluble silicates.

The carrier fluid used for the coating composition can be either an aqueous or non-aqueous carrier fluid, and generally it makes up the balance of the coating composition. Broadly stated, the carrier fluid may be present anywhere in the range of zero to about 98% by weight of the coating composition, and generally it will be present within the range of about 0.1% to about 97% by weight of the coating composition. Preferably the carrier fluid is present within the range about 75% to about 97% by weight of the coating composition, and best results are obtained when the carrier fluid is present within the range of about 85% to 97% by weight of the coating composition. Water is the preferred carrier fluid, however, other carrier fluids may also be utilized such as an alcohol, Ketones, mineral spirits, toluene, esters, cellosolve, ethers, methylene chloride and glycols.

The coating composition referred to herein is applied at a desired thickness on the front panel or substrate 42, with the thickness being broadly within the range of about 0.05 to about 20 microns; and, preferably the coating composition is applied at a thickness of about 0.1 to about 5 microns. Best results are obtained when the applied coating or layer 50 has a thickness on the substrate 42 of less than about 1 micron. The coating composition is applied by techniques such as silk screening, photolithography, electrographically, or by screen printing. Any of these techniques can be used to provide the appropriate spacing of small apertures or holes in the applied coating or layer 50, as shown deposited on the substrate 42 in FIG. 2. Line apertures may also be used instead of hole apertures. The preferred technique for applying the coating or layer 50 on the substrate 42 is by photolithography.

It is not fully understood why the invention as described herein provides such significant advantages and/or technically advantageous operation; however, the advantages obtained with the invention are a unique wider viewing angle of the visual image of the liquid crystal display device when viewed from the front of the device as shown by the arrow 74 FIG. 2. In addition, the usage of chromium materials, chromium coatings (or other sputtered metals), is avoided (or not necessary) in this invention and such prior materials such as chromium are expensive and difficult to use in actual application conditions. Also in the present invention, the cost of the materials and the manufacturing process costs are greatly improved. It is also to be understood that the compositions referred to in this invention may include minor amounts of other additives, such as, at least one material selected from the group consisting of a surfactant agent, a preservative agent, an inorganic thickener agent, and an organic thickener agent. The preferred or best coating compositions for usage are: Electrodag CB-800a, Electrodag CB-007, and Electrodag 1530, available from Acheson Colloids Co., Port Huron, Mich., U.S.A.

In order to further illustrate the invention, the following examples are provided. It is to be understood however that the example compositions are included for illustrative purposes and are not intended to be limiting of the scope of the invention as set forth in the subjoined claims.

|  | Parts by Weight (or % by Weight) |
|---|---|
| Example 1 | |
| Graphite | 18.8 |
| Cellulosic Resin | 1.2 |
| Inorganic Thickener | 0.86 |
| Surfactant | 1.34 |
| Preservative | 0.3 |
| Water | 77.5 |
| Example 2 | |
| Graphite | 19.59 |
| Carbon Black | 2.88 |
| Cellulosic Resin | 0.67 |
| Surfactant | 0.37 |
| Acrylic Resin | 25.1 |
| Preservative | 0.23 |
| Water | 51.16 |
| Example 3 | |
| Graphite | 15.4 |
| Cellulosic Resin | 4.6 |
| IPA (isopropyl alcohol) | 66.2 |
| Solvent Blend | 13.8 |
| Example 4 | |
| Graphite | 20.0 |
| Carbon Black | 6.7 |
| Vinyl Resin | 9.2 |
| Solvent Blend (Ketones) | 72.6 |
| Example 5 | |
| Graphite | 3.86 |
| Inorganic Thickener | 0.25 |
| Cellulosic Resin | 0.92 |
| Solvent Blend | 94.33 |
| Example 6 | |
| Graphite | 9.12 |
| Cellulosic Resin | 2.72 |
| Methylene Chloride | 80.0 |
| Solvent Blend | 8.16 |
| Example 7 | |
| Graphite | 19.0 |
| Polysaccharide | 3.0 |
| Water | 78.0 |
| Example 8 | |
| Graphite | 7.87 |
| Polysaccharide (binder) | 1.10 |
| Cellulosic resin | 0.05 |
| Silica | 0.9 |
| Surfactant | 0.03 |
| Water | 90.05 |
| Example 9 | |
| Graphite | 7.81 |
| Polysaccharide | 1.09 |
| Cellulosic Resin | 0.12 |
| Silica | 0.90 |
| Surfactant | 0.03 |
| Water | 90.05 |
| Example 10 | |
| Graphite | 7.75 |
| Polysaccharide | 1.09 |
| Acrylic Resin | 0.09 |
| Silica | 0.95 |
| Surfactant | 0.02 |
| Water | 90.1 |

-continued

|  | Parts by Weight (or % by Weight) |  |
|---|---|---|
| Example 11 | | |
| Graphite | 25.81 | |
| Polysaccharide | 4.82 | |
| Preservative Agent | 0.02 | |
| Water | 69.35 | |
| Example 12 | | |
| Graphite | 10.0 | |
| Hydrocarbon Polymer Resin | 1.80 | (polyisobutylene) |
| Odorless Solvent | 85.7 | |
| Diester Carrier/Solvent | 2.5 | |
| Example 13 | | |
| Graphite | 18.0 | |
| Carbon Black | 6.0 | |
| Vinyl Resin | 12.0 | |
| Butyl Cellosolve Acetate | 64.0 | |
| Example 14 | | |
| Graphite | 8.9 | |
| Hydrocarbon Polymer Resin | 3.0 | |
| Organic Thickener | 3.0 | |
| Mineral Spirits | 85.1 | |

While it will be apparent that the preferred embodiments of the invention disclosed are well calculated to fulfill the objects, benefits and/or advantages of the invention, it will be appreciated that the invention is susceptible to modification, variation and change without departing from the proper scope or fair meaning of the subjoined claims.

What is claimed is:

1. A liquid crystal display device having a liquid crystal layer interposed between a pair of substrates, said substrates being coupled to each other through an insulative sealing material at the peripheral portions thereof,
   one of said pair of substrates being a transparent front substrate through which viewing of the display device occurs, and
   a graphite containing matrix coating on an inside surface of the front substrate, said coating having a matrix of apertures therein, said coating being applied by application of a composition comprising in weight percent,
   about 1% to about 30% colloidal graphite,
   about 0.1% to about 20% binder material for the coating, and
   about 10% to about 98% of a fluid carrier,
   said applied coating having a thickness of less than about 20 microns.

2. The liquid crystal display device of claim 1 wherein, said applied coating has a thickness of about 0.05 to about 20 microns.

3. The liquid crystal display device of claim 2 wherein, said applied coating has a thickness of less than about 5 microns.

4. The liquid crystal display device of claim 1 wherein, said colloidal graphite percent is about 2% to about 18%, said binder material percent is about 0.2% to about 6%, said fluid carrier percent is about 75% to about 97%.

5. The liquid crystal display device of claim 4 wherein, said applied coating has a thickness of less than about 5 microns.

6. The liquid crystal display device of claim 4 wherein, said applied coating has a thickness of less than about 1 micron.

7. The liquid crystal display device of claim 1 wherein, said colloidal graphite percent is about 3% to about 10%, said binder material percent is about 0.3% to about 2%, said fluid carrier percent is about 85% to about 97%.

8. The liquid crystal display device of claim 7 wherein, said applied coating has a thickness of less than about 1 micron.

9. The liquid crystal device of claim 1 wherein, said applied coating has a thickness of about 0.05 to about 20 microns, said colloidal graphite percent is about 2% to about 18%, said binder material percent is about 0.2% to about 6%, said fluid carrier percent is about 75% to about 97%.

10. The liquid crystal display device of claim 9 wherein, said applied coating has a thickness of less than about 5 microns.

11. In a liquid crystal display device having a liquid crystal layer interposed between a pair of substrates, said substrates being coupled to each other through an insulative sealing material at the peripheral portions thereof, one of said pair of substrates being a transparent front substrate through which viewing of the display device occurs, the improvement of, a graphite containing matrix coating on an inside surface of the front substrate, said coating having a matrix of apertures therein, said coating being applied by application of a composition comprising in weight percent, about 1% to about 30% colloidal graphite, about 0.1% to about 20% binder material for the coating, and about 10% to about 98% of a fluid carrier, said applied coating having a thickness of less than about 20 microns.

12. In a liquid crystal display device of claim 11 wherein, said applied coating has a thickness of about 0.05 to about 20 microns.

13. In a liquid crystal display device of claim 12 wherein, said colloidal graphite percent is about 2% to about 18%, said binder material percent is about 0.2% to about 6%, said fluid carrier percent is about 75% to about 97%.

14. In a liquid crystal display device of claim 13 wherein, said applied coating has a thickness of less than about 5 microns.

15. In a liquid crystal display device of claim 14 wherein, said colloidal graphite percent is about 3% to about 10%, said binder material percent is about 0.3% to about 2%, said fluid carrier percent is about 85% to about 97%.

16. In a liquid crystal display device of claim 15 wherein, said applied coating has a thickness of less than about 1 micron.

17. A method of making a liquid crystal display device having a liquid crystal layer interposed between a pair of substrates, said substrates being coupled to each other through an insulative sealing material at the peripheral portions thereof, one of said pair of substrates being a transparent front substrate through which viewing of the display device occurs, and a graphite containing matrix coating on an inside surface of the front substrate, said coating having a matrix of apertures therein, said coating being applied by application of a composition comprising in weight percent, about 1% to about 30% colloidal graphite, about 0.1% to about 20% binder material for the coating, and about 10% to about 98% of a fluid carrier, said method comprising the steps of:
(a) applying said coating to said inside surface of said front substrate by a coating technique selected from the group consisting of silk screening, photolithography, electrographically, and screen printing, said applied coating having a thickness of less than about 20 microns, (b) and subsequently coupling the pair of substrates to each other with an insulative material to seal said peripheral portions thereof.

18. The method of claim 17 wherein, said applied coating has a thickness of about 0.05 to about 20 microns.

19. The method of claim 18 wherein, said colloidal graphite percent is about 2% to about 18%, said binder material percent is about 0.2% to about 6%, said fluid carrier percent is about 75% to about 97%.

20. The method of claim 19 wherein, said applied coating has a thickness of less than about 5 microns.

21. The method of claim 17 wherein, said colloidal graphite percent is about 3%to about 10% said binder material percent is about 0.3% to about 2% said fluid carrier percent is about 85% to about 97%.

22. The method of claim 21 wherein, said applied coating has a thickness of less than about 1 micron.

23. The method of claim 17 wherein, said applied coating has a thickness of about 0.05 to about 20 microns, said colloidal graphite percent is about 2% to about 18%, said binder material percent is about 0.2% to about 6%, said fluid carrier percent is about 75% to about 97%.

24. The method of claim 17 wherein, said coating technique is photolithography.

25. The method of claim 24 wherein, said applied coating has a thickness of about 0.05 to about 20 microns.

26. The method of claim 25 wherein, said colloidal graphite percent is about 2% to about 18%, said binder material percent is about 0.2% to about 6%, said fluid carrier percent is about 75% to about 97%.

27. The method of claim 26 wherein, said applied coating has a thickness of less than about 5 microns.

28. The method of claim 27 wherein, said colloidal graphite percent is about 3% to about 10%, said binder material percent is about 0.3% to about 2%, said fluid carrier percent is about 85% to about 97%.

29. The method of claim 28 wherein, said applied coating has a thickness of less than about 1 micron.

* * * * *

UNITED STATES PATENT AND TRADEMARK OFFICE
CERTIFICATE OF CORRECTION

PATENT NO.   : 5,885,669
DATED        : March 23, 1999
INVENTOR(S)  : Morgans et al.

It is certified that error appears in the above-identified patent and that said Letters Patent is hereby corrected as shown below:

Column 3,
Line 62, please delete "1" and insert -- 5 --

Signed and Sealed this

Fourth Day of March, 2003

JAMES E. ROGAN
*Director of the United States Patent and Trademark Office*